Nov. 18, 1958    F. Z. HARRIS    2,860,432
SERVICING RECORDING DEVICES
Filed Jan. 2, 1957
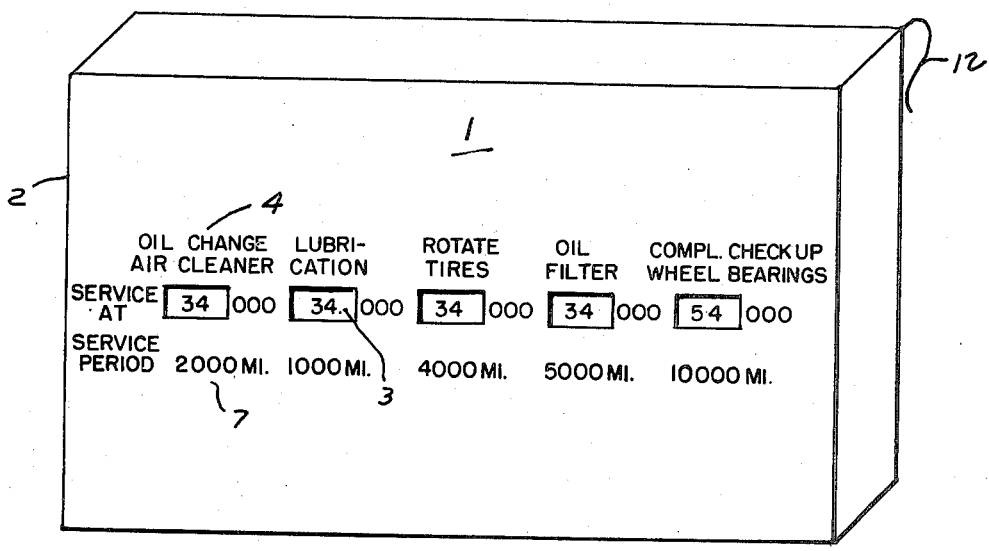
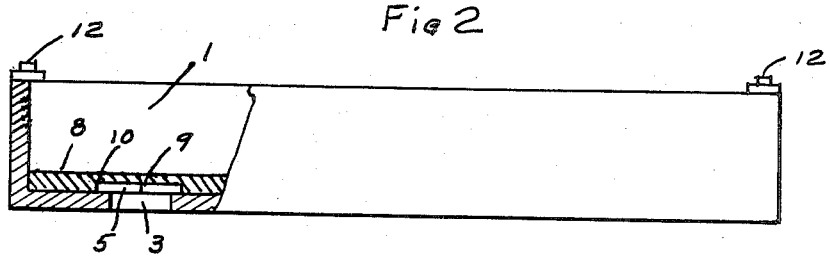
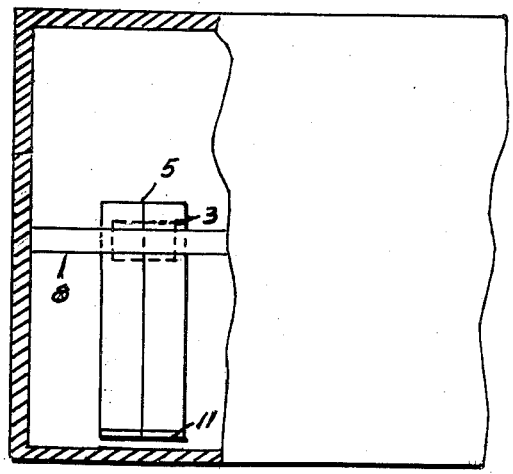
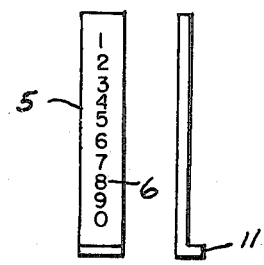
Fred Z. Harris

United States Patent Office

2,860,432
Patented Nov. 18, 1958

2,860,432

SERVICING RECORDING DEVICES

Fred Z. Harris, San Francisco, Calif.

Application January 2, 1957, Serial No. 632,627

2 Claims. (Cl. 40—65)

The present invention relates generally to improvements in servicing recording devices or indicators, and more particularly to indicators for vehicles such as automobiles, trucks, locomotives and similar.

A general object of the invention is to provide an improved indicator for evidencing and indicating the period of necessary servicing or adjustments which have to be done on vehicles at certain intervals or after a certain mileage for which the vehicle has been in use. The servicing indicator is particularly designed to indicate at any desired moment the mileage at which the required servicing has to be performed on the vehicle which are necessary for a satisfactory maintenance of the same, and at what respective servicing periods each particular maintenance service has to be performed.

Similar devices are known in the art, but none of them operated satisfactory. The previously known indicators were rather clumsy, of a substantially complicated construction and were very expensive in manufacturing. These devices were also easy accessible to every person authorized or not, so that undesired use of the device, for instance, by children made a satisfactory operation of the device impossible. A further disadvantage of the old constructions of the indicators were very difficult to be mounted in the vehicle. Numerous indicating devices are necessary for operation of a vehicle, which have to be steadily observed by the operator, such as the speedometer, gasoline and oil gauges etc., so that very little space is left in the vehicle for additional indicating devices.

It should be also noted that it is conventional in the art that after servicing the vehicle the attendant places a recording of the effected servicing on the vehicle, usually behind the door of the vehicle. In case the operator of the vehicle wants to determine when the subsequent servicing is to be done, he has first to open the door, read the respective recording, which is often difficult to read, behind the door, to compare the respective reading with the reading of the speedometer and then to calculate the mileage at which the respective next servicing has to be performed.

It should be also noted that when recording the effected service of a certain art, the attendant should transfer the recordings relating to previous services, other than the one performed, onto the new recording which the attendant has to place instead of the old one. This transfer is very often omitted by the attendant so that the operator of the vehicle loses the control of servicing and has no means to determine the respective mileage when the following servicing has to be performed. This may substantially endanger the maintenance and the life of the vehicle. Larger repairs may become necessary due to lack of proper servicing, which could be easily avoided if the vehicle would have been serviced at the appropriate time.

The present invention eliminates all these disadvantages and provides an improved servicing indicator for vehicles which can be easily mounted in the proximity of the operator and can be easily adjusted by the operator. The servicing indicator can be very easily and inexpensively manufactured, particularly if plastic materials are used. The costs of the inventive indicator are so small that same can be made available to every operator and to every vehicle. The design of the inventive device also eliminates any danger that the operator may lose the control of the time or mileage when the last servicing was performed.

The inventive device is very compact and of a very simple construction. All superfluous parts are eliminated and all parts are preferably made of moulded plastics or similar inexpensive material, thus considerably simplifying the manufacture and assembly of the servicing indicating device.

Another object of the present invention is to provide a new construction which can be readily fastened at any desired position in the vehicle.

Yet another object of the invention is to provide a servicing indicator device which can be easily built into the instrument panel or any other part of the vehicle and is easily visible to the operator.

Further objects and advantages of the invention will readily become apparent upon reading the following specification taken in conjunction with the accompanying drawings in which:

Fig. 1 is an elevational view of the servicing indicator embodying the principles of this invention.

Fig. 2 is a partially sectional view of the indicator, illustrating the position of the indicating slides in the device.

Fig. 3 is a partially sectional view of the indicator as viewed from the rear of the device, and Fig. 4 is a view of the indicator slides as viewed from the front and side.

Referring now to the drawings and more particularly to Figs. 1 to 3 thereof, the reference numeral 1 designates the servicing indicator, made in accordance with the present invention. The front wall 2 of the indicator is provided with a plurality of small windows 3 in which the respective information of the mileage is shown which indicates when the next servicing has to be performed. The respective mileage necessary for the next corresponding servicing will have to be performed being indicated on the front wall 2. The operator of the vehicle can thus easily determine when the respective servicing has to be effected by simply comparing the readings on the indicator and the speedometer reading of the vehicle. On one section of the front panel 2 are printed the indications 4 designated to show the different types of servicing to be effected, such as lubrication of the vehicle, change of oil, change of filters etc. These indications 4 can be made of different colors so as to better distinguish the different operations.

Behind each window 3 is disposed a slide 5, preferably a pair of slides 5 for each window. Said slides 5 are provided with corresponding printed reference indications 6, showing to the operator at any moment when the next servicing has to be performed. The references 6 and 7 can also be printed in different colors, so as to give a distinctive and clear indication of the different service periods for different services. The respective slides 5 are held in their relative position with respect to the windows 3 by means of a transversal strip 8, which is preferably made of plastic material, and which extends along the whole length of the servicing indicator, and secures the appropriate distancing of the slides 5 behind the respective windows 3 for steady positioning, but easy movement of said slides relative to the windows 3. The strip is preferably provided with recesses 9 of approximate width equal to the width of two slides for correct lateral positioning of the slides 5 relative to the windows. The slides 5 being held in their respective transversal position by shoulders 10 in said recesses 9.

The slides are provided on their rear surface, preferably at the bottom end of same with projections 11, for an easier handling of the up and down movement of the slides 5 behind the window 3.

The servicing indicator 1 is moulded of plastic or any similar material, together with the windows 3, the transversal strip 8 and all the necessary accessories, in one operation and can thus be easily and inexpensively manufactured. Hooks 12 or similar fastening means are provided at the rear side of the device, preferably in both upper corners of same, thus enabling a quick and easy mounting of the device at any desired place in the vehicle. These hooks 12 can be made in form of pins, or preferably of a width of ½" hooks, which would enable a simple affixing of the device to the sun visor of the vehicle or other parts of same. The indicator is preferably placed in the vehicle in the next proximity of the operator, so that he can check at any time if and when a certain servicing has to be performed.

The following is an example of the usefulness of the indicator. An automobile must be serviced after it has been used for travel for a specific distance expressed in the respective mileage made by the automobile. Thus after, for instance, each 1000 miles the vehicle must be lubricated; after each 2000 miles the crankcase oil must be changed. Other services must be performed after different periods of time, respectively after certain mileage made by the automobile.

The servicing indicator 1 shows in the windows 3 when the respective servicing has again to be performed, while the printed references 7 indicate the servicing periods for each particular service on the vehicle.

The servicing indicator can be made relatively very small. The hooks may be placed into the indicator during the moulding process and the device can be pressed in one operation.

In order to prevent children of playing with the indicating device and exchanging the indicated mileage, what would be highly undesirable, the indicator is made accessible only from the rear, so that for any adjustment to be made, the indicating device 1 must be lifted by approximately ½", has to be adjusted accordingly and by releasing the finger out of adjustment, be subsequently returned in its original position.

The transversal strip 8 can be made of a transparent material and the respective reference indications 6 also printed on the rear side of the slides 5, so as to facilitate the correct adjustment of the respective slides relative to the windows 3, from the rear of the servicing indicator 1, because the transversal strip 8 in this case would be made slightly narrower than the width of the windows 3, so that the corners of the window will be seen from the rear of the indicator, thus substantially facilitating the adjustment of the slides relative to the windows.

As the indicator is a simple plastic moulding and relatively little labor is required, the article can be placed on the market at an extremely low price. Every vehicle will thus be able to use this simple and useful indicating device.

Although a specific structure of the inventive device was shown and described, it is to be clearly understood that the same is for the purpose of illustration only and that changes and modifications may readily be made therein, without departing from the scope of the invention.

What I claim is:

1. A device for visual indication of the recommended speedometer readings of a plurality of common future automobile servicing requirements, which comprises a rectangular, flat, shallow casing having a front formed with a plurality of spaced apertures spaced along a line extending across said front substantially midway between the top and bottom of said front and marked with first indicia adjacent each said aperture, said first indicia setting forth the nature of each of said servicing requirements, said casing further having thin sides along the edges of said front, a transversal strip extending across and fixed to the back face of said front behind said line of said apertures, said strip being formed with a plurality of grooves in its face adjacent said front and each positioned immediately behind one of said apertures, and a plurality of rigid slide members each of a length substantially equal to one-half the height of said front fitting into said grooves and slidable in a direction parallel to said front and transverse to said transversal strip, said slide members being frictionally retained within said casing by said transversal strip by engagement with said slide members, said slide members being marked with second indicia positioned to be exposed through said apertures, said second indicia being mileage indications, said slide members being provided with finger tabs extending rearwardly, the thickness of said casing being sufficient to completely enclose said slide members and tabs.

2. A device according to claim 1, in which each said groove and each said aperture has a width substantially equal to two said slide members and two said slide members are positioned in each said groove, said two slide members being independently slidable.

References Cited in the file of this patent

UNITED STATES PATENTS

| | | |
|---|---|---|
| 1,672,389 | Mahon | June 5, 1928 |
| 1,749,619 | Widoe | Mar. 4, 1930 |
| 1,754,383 | Brown | Apr. 15, 1930 |
| 1,773,670 | Girlich | Aug. 19, 1930 |
| 1,811,778 | Bowen | June 23, 1931 |
| 1,851,245 | Fischer | Mar. 29, 1932 |
| 2,770,900 | Smith | Nov. 20, 1956 |